US010807045B2

(12) United States Patent
Song et al.

(10) Patent No.: US 10,807,045 B2
(45) Date of Patent: Oct. 20, 2020

(54) CENTRAL TUBE FOR FILTER CARTRIDGE AND FILTERING DEVICE HAVING SAME

(71) Applicants: FOSHAN MIDEA CHUNGHO WATER PURIFICATION EQUIPMENT CO., LTD., Foshan (CN); MIDEA GROUP CO., LTD., Foshan (CN)

(72) Inventors: Guodong Song, Foshan (CN); Xuegang Cai, Foshan (CN); Peng Gui, Foshan (CN)

(73) Assignees: Foshan Midea Chungho Water Purification Equipment Co., Ltd., Foshan (CN); Midea Group Co., Ltd., Foshan (CN)

( * ) Notice: Subject to any disclaimer, the term of this patent is extended or adjusted under 35 U.S.C. 154(b) by 207 days.

(21) Appl. No.: 16/034,144

(22) Filed: Jul. 12, 2018

(65) Prior Publication Data

US 2018/0318768 A1 Nov. 8, 2018

Related U.S. Application Data

(63) Continuation of application No. PCT/CN2016/113783, filed on Dec. 30, 2016.

(30) Foreign Application Priority Data

Jan. 13, 2016 (CN) .......................... 2016 1 0021036
Jan. 13, 2016 (CN) ..................... 2016 2 0030746 U

(51) Int. Cl.
*B01D 63/08* (2006.01)
*B01D 63/10* (2006.01)
(Continued)

(52) U.S. Cl.
CPC ............ *B01D 63/087* (2013.01); *B01D 61/08* (2013.01); *B01D 63/10* (2013.01); *C02F 1/44* (2013.01);
(Continued)

(58) Field of Classification Search
None
See application file for complete search history.

(56) References Cited

U.S. PATENT DOCUMENTS

| 5,281,430 A | 1/1994 | Herron et al. | |
|---|---|---|---|
| 2011/0233128 A1* | 9/2011 | Beauchamp | B01D 63/103 210/232 |
| 2019/0022589 A1* | 1/2019 | Song | B01D 63/00 |

FOREIGN PATENT DOCUMENTS

| CN | 102186566 A | 9/2011 |
|---|---|---|
| CN | 104258733 A | 1/2015 |

(Continued)

OTHER PUBLICATIONS

CN105129916 Song et al.—Center pipe assembly of filtration core, and preparation method thereof [Abstract & MT; Dec. 9, 2015]. (Year: 2015).*

(Continued)

*Primary Examiner* — Hayden Brewster
(74) *Attorney, Agent, or Firm* — Morgan, Lewis & Bockius LLP

(57) ABSTRACT

Provided are a central tube for a filter cartridge and a filter device having same. The central tube (100) comprises a first half tube (1), a second half tube (2) and a membrane element (3), wherein the first half tube (1) has a first mating surface, and the first mating surface is grooved to form a first flow channel (111); the second half tube (2) has a second mating surface, the second mating surface is grooved to form a second flow channel (21), and the first half tube (1) and the second half tube (2) are butt-jointed to form a hollow, (Continued)

straight tube shape; and the membrane element (3) is arranged between the first half tube (1) and the second half tube (2) and seals the first flow channel (111) and the second flow channel (21), respectively.

18 Claims, 12 Drawing Sheets

(51) Int. Cl.
    *B01D 61/08* (2006.01)
    *B01D 61/20* (2006.01)
    *B01D 61/10* (2006.01)
    *C02F 1/44* (2006.01)

(52) U.S. Cl.
    CPC .............. *B01D 61/10* (2013.01); *B01D 61/20* (2013.01); *B01D 2313/025* (2013.01); *B01D 2313/08* (2013.01); *B01D 2313/10* (2013.01); *B01D 2313/12* (2013.01); *B01D 2313/13* (2013.01); *B01D 2313/21* (2013.01)

(56) References Cited

FOREIGN PATENT DOCUMENTS

| | | |
|---|---|---|
| CN | 105129916 A | 12/2015 |
| CN | 204816235 U | 12/2015 |
| CN | 204848371 U | 12/2015 |
| CN | 105498544 A | 4/2016 |
| CN | 205760649 U | 12/2016 |
| JP | 07308552 | 11/1995 |

OTHER PUBLICATIONS

Foshan Midea Chungho Water Purification Mfg. Co. Ltd., First Office Action, CN201610021036.7, dated Apr. 6, 2017, 13 pgs.
Foshan Midea Chungho Water Purification Mfg. Co. Ltd., Third Office Action, CN201610021036.7, dated Jun. 4, 2018, 10 pgs.
Midea, International Search Report and Written Opinion, PCT/CN2016/113783, dated Apr. 1, 2017, 21 pgs.

\* cited by examiner

CENTRAL TUBE FOR FILTER CARTRIDGE AND FILTERING DEVICE HAVING SAME

PRIORITY CLAIM AND RELATED APPLICATION

This application is a continuation of PCT Patent Application No. PCT/CN2016/113783, entitled "CENTRAL TUBE FOR FILTER CARTRIDGE AND FILTERING DEVICE HAVING SAME" filed on Dec. 30, 2016, which claims priority to (i) Chinese Patent Application No. 201610021036.7, entitled "CENTRAL TUBE FOR FILTER CARTRIDGE AND FILTERING DEVICE HAVING SAME" filed on Jan. 13, 2016 and (ii) Chinese Patent Application No. 201620030746.1, entitled "CENTRAL TUBE FOR FILTER CARTRIDGE AND FILTERING DEVICE HAVING SAME" filed on Jan. 13, 2016, all of which are hereby incorporated by reference in their entirety.

TECHNICAL FIELD

The present disclosure relates to a technical field of water purification units, and more particularly to a central tube for a filter cartridge and a filtering device having the same.

BACKGROUND

Filtration technologies in a household water purifier generally include a microfiltration technology, an ultrafiltration technology, an ion exchange technology, an adsorption technology and a reverse osmosis (RO)/nano-filtration (NF) technology. For the RO/NF, the core component is a RO/NF membrane element. The RO/NF membrane element will produce concentrated water during operations, and purified water just occupies about 30% of inflowing water, thus resulting in relatively large waste. In a water inflowing manner of the traditional membrane element, a direction along which raw water flows in and concentrated water flows out is parallel to a purified-water collecting tube (the central tube), and hence the flow passage is short. In the related art, it is achieved by changing the flowing direction of the raw water in the membrane element such that the flowing direction of the raw water is partially or completely perpendicular to the direction of the central tube. For example, in the related art, the flowing speed direction along which the raw water flows in and the direction along which the concentrated water flows out are perpendicular to the central tube, but the specific structure of the central tube cannot achieve the mold making for a household water purifier, and thus a mass production cannot be obtained.

SUMMARY

Embodiments of the present disclosure seek to solve at least one of the problems existing in the related art to at least some extent. For that reason, the present disclosure provides a central tube for a filter cartridge, which is simple in structure, convenient for mold making and suitable for mass production.

The present disclosure further provides a filtering device having the above-mentioned central tube.

The central tube for the filter cartridge according to a first aspect of the present disclosure includes: a first half-tube having a first fitting surface extending along an axial direction of the first half-tube, and the first fitting surface being slotted to provide a first flow passage extending along an axial direction, the first half-tube having a first close end closed and a second end having a first through hole communicated with the first flow passage, a side wall of the first half-tube having a first via hole communicated with the first flow passage; a second half-tube having a second fitting surface extending along an axial direction of the second half-tube, and the second fitting surface being slotted to provide a second flow passage extending along the axial direction, the second half-tube having a first close end closed and a second end having a second through hole communicated with the second flow passage, a side wall of second half-tube having a second via hole communicated with the second flow passage, the first half-tube and the second half-tube being butted, the first fitting surface and the second fitting surface being opposite to each other, the first half-tube and the second half-tube being fitted to provide a hollow straight tube; and a membrane element disposed between the first half-tube and the second half-tube, and closing the first flow passage and the second flow passage respectively.

In the central tube for the filter cartridge according to the present disclosure, the first half-tube and the second half-tube are fitted to provide the central tube, and the fitting surfaces of the first half-tube and the second half-tube are slotted respectively to provide the first flow passage and the second flow passage, thus simplifying the structure of the central tube, facilitating the mold making of the central tube, and thereby achieving the mass production of the central tube.

According to an example of the present disclosure, an inner surface of at least one of the first flow passage and the second flow passage is provided with a reinforcing rib abutting against the membrane element.

According to an example of the present disclosure, two sides of the inner surface of the first flow passage are each provided with a plurality of first transverse reinforcing rib sets, in which the two sides of the first flow passage are opposite to each other along a direction perpendicular to an axis of the first flow passage, and the plurality of first transverse reinforcing rib sets on the two opposite sides of the inner surface of the first flow passage are staggeredly arranged.

According to an example of the present disclosure, the inner surface of the first flow passage is provided with an axial reinforcing rib extending along the axial direction of the first half-tube, and the plurality of first transverse reinforcing rib sets are arranged on two sides of the axial reinforcing rib.

According to an example of the present disclosure, each first transverse reinforcing rib set includes two first transverse reinforcing ribs, and a distance spaced by the two first transverse reinforcing ribs in the axis direction is not less than 2 millimeters.

According to an example of the present disclosure, the first transverse reinforcing rib set is flush with the first fitting surface, and a free end of the first transverse reinforcing rib has a rounded chamfer.

According to an example of the present disclosure, the first via hole is provided between each two adjacent first transverse reinforcing rib sets in the axial direction.

According to an example of the present disclosure, two sides of the inner surface of the second flow passage each are provided with a plurality of second transverse reinforcing rib sets, in which the two sides of the second flow passage are opposite to each other along a direction perpendicular to an axis of the second flow passage, and the plurality of second transverse reinforcing rib sets on the two opposite sides of the inner surface of the second flow passage are staggeredly arranged.

According to an example of the present disclosure, each second transverse reinforcing rib set includes two second transverse reinforcing ribs, and a distance spaced by the two second transverse reinforcing ribs in the axis direction is not less than 2 millimeters.

According to an example of the present disclosure, the second transverse reinforcing rib set is flush with the second fitting surface, and a free end of the second transverse reinforcing rib has a rounded chamfer.

According to an example of the present disclosure, the second via hole is provided between each two adjacent second transverse reinforcing rib sets in the axial direction.

According to an example of the present disclosure, the two ends of the first half-tube each are provided with a first process positioning groove extending along a circumferential direction of the first half-tube, the first flow passage is located between the two first process positioning grooves, the two ends of the second half-tube each are provided with a second process positioning groove extending along a circumferential direction of the second half-tube, and the second flow passage is located between the two second process positioning grooves.

According to an example of the present disclosure, a distance between each of the two ends of the first flow passage and the corresponding first process positioning grooves is in a range from 10 millimeters to 20 millimeters, and a distance between each of the two ends of the second flow passage and the corresponding second process positioning grooves is in a range from 10 millimeters to 20 millimeters.

According to an example of the present disclosure, a section of at least part of any one of the first half-tube and the second half-tube has a semicircle shape, the first via hole is formed in an arc surface of the first half-tube, and the second via hole is formed in an arc surface of the second half-tube.

According to an example of the present disclosure, the two ends of the first half-tube are provided with a first upper fitting part and a first lower fitting part correspondingly, the two ends of the second half-tube are provided with a second upper fitting part and a second lower fitting part correspondingly, the first upper fitting part is snap-fitted with the second upper fitting part, and the first lower fitting part is snap-fitted with the second lower fitting part correspondingly.

According to an example of the present disclosure, the first upper fitting part and the first lower fitting part each include two locking protrusions arranged at intervals in a direction perpendicular to the axis of the first half-tube, and the second upper fitting part and the second lower fitting part each include two locking grooves in two sides of the second half-tube, in which the two sides of the second half-tube are in a direction perpendicular to the axis of the second half-tube.

According to an example of the present disclosure, dimensions of the first upper fitting part and the first lower fitting part in the axis direction are different.

According to an example of the present disclosure, the two ends of the first half-tube in the axial direction each are provided with a boss protruding beyond the first fitting surface, and the first upper fitting part and the first lower fitting part are arranged on the bosses correspondingly.

According to an example of the present disclosure, the first half-tube includes a main body, a first columnar body and a second columnar body, the first columnar body and the second columnar body are disposed at two ends of the main body correspondingly, the first columnar body defines the first through hole therein, the second half-tube are fitted with the main body and located between the first columnar body and the second columnar body.

According to an example of the present disclosure, the first close end of the first half-tube is provided with a first positioning hole extending in the axial direction and spaced apart from the first flow passage, and the first close end of the second half-tube is provided with a second positioning hole extending in the axial direction and spaced apart from the second flow passage.

The filtering device according to a second aspect of the present disclosure includes: a central tube for a filter cartridge according to the first aspect of the present disclosure; an upper-end cover provided with a first guiding tube and a second guiding tube, the upper-end cover being connected to the second end of the first half-tube and the second end of the second half-tube, the first guiding tube being inserted in the first through hole, the second guiding tube being inserted in the second through hole; a lower-end cover connected to the first close ends of the first half-tube and the second half-tube.

The filtering device according to embodiments of the present disclosure, by providing the central tube for the filter cartridge according to the first aspect of the present disclosure, thus improves the overall properties of the filtering device.

According to an example of the present disclosure, the first close end of the first half-tube is provided with a first positioning hole extending in the axial direction and spaced apart from the first flow passage, the first close end of the second half-tube is provided with a second positioning hole extending in the axial direction and spaced apart from the second flow passage, the lower-end cover is provide with a first positioning tube and a second positioning tube, the first positioning tube is inserted in the first positioning hole, and the second positioning tube is inserted in the second positioning hole.

Additional aspects and advantages of embodiments of present disclosure will be given in part in the following descriptions, become apparent in part from the following descriptions, or be learned from the practice of the embodiments of the present disclosure.

Figure 1:
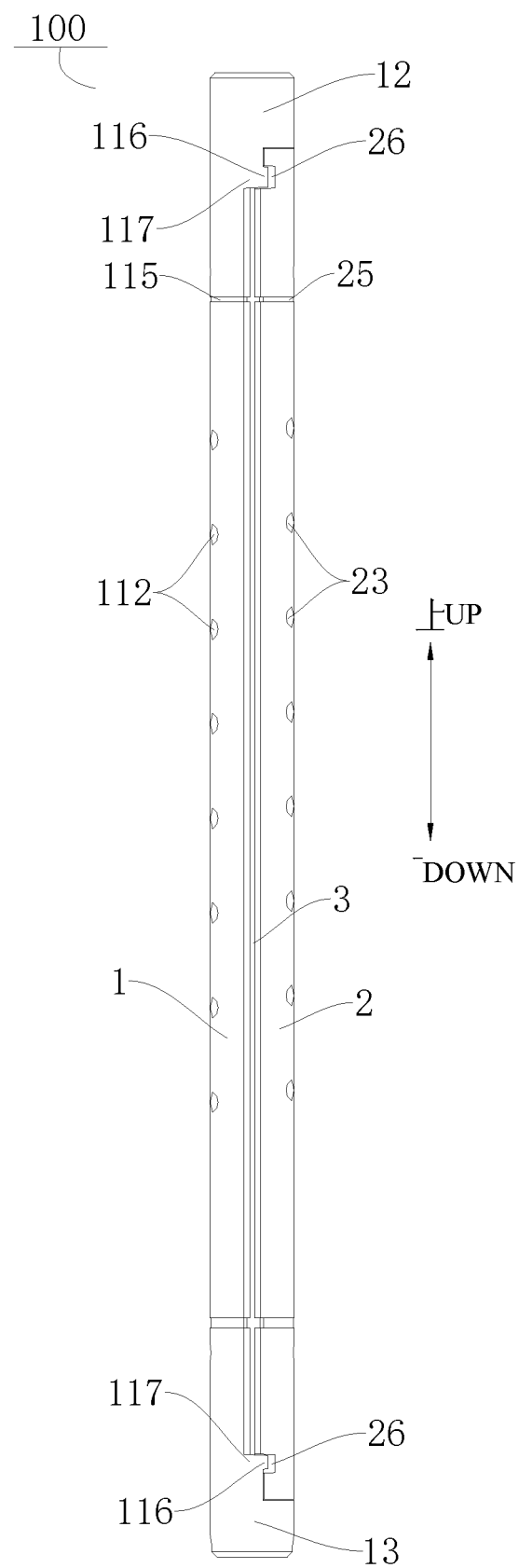
FIG. 1 is a schematic view of a central tube for a filtering cartridge according to embodiments of the present disclosure.

REFERENCE NUMERALS central tube 100;
first half-tube 1,
  main body 11, first flow passage 111, first via hole 112, first transverse reinforcing rib set 113, first transverse reinforcing rib 1131, axial reinforcing rib 114, first process positioning groove 115, locking protrusion 116, boss 117, first groove 118,
  first columnar body 12, first through hole 121, positioning groove 122,
  second columnar body 13, first positioning hole 131, tooling bayonet 132,
  second half-tube 2,
  second flow passage 21, second through hole 22, second via hole 23, second transverse reinforcing rib set 24, second transverse reinforcing rib 241,
  second process positioning groove 25, locking groove 26, second positioning hole 27, second groove 28,
  membrane element 3,
  upper-end cover 200, first guiding tube 201, second guiding tube 202, positioning flange 203, first position limiting rib 204, annular sealing groove 205,
  lower-end cover 300, first positioning tube 301, second positioning tube 302, second position limiting rib 303, elastic positioning member 304.

DETAILED DESCRIPTION

Embodiments of the present disclosure will be described in detail herein, and examples of the embodiments are illustrated in the drawings. The same or similar elements and the elements having same or similar functions are denoted by like reference numerals throughout the descriptions. The embodiments described herein with reference to drawings are explanatory, and used to generally understand the present disclosure. The embodiments shall not be construed to limit the present disclosure.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

A central tube 100 for a filter cartridge according to embodiments of a first aspect of the present disclosure will be described herein with reference to FIGS. 1-15.

As shown in FIG. 1, the central tube 100 for the filter cartridge according to embodiments of the first aspect of the present disclosure includes a first half-tube 1, a second half-tube 2 and a membrane element 3.

Figure 2:
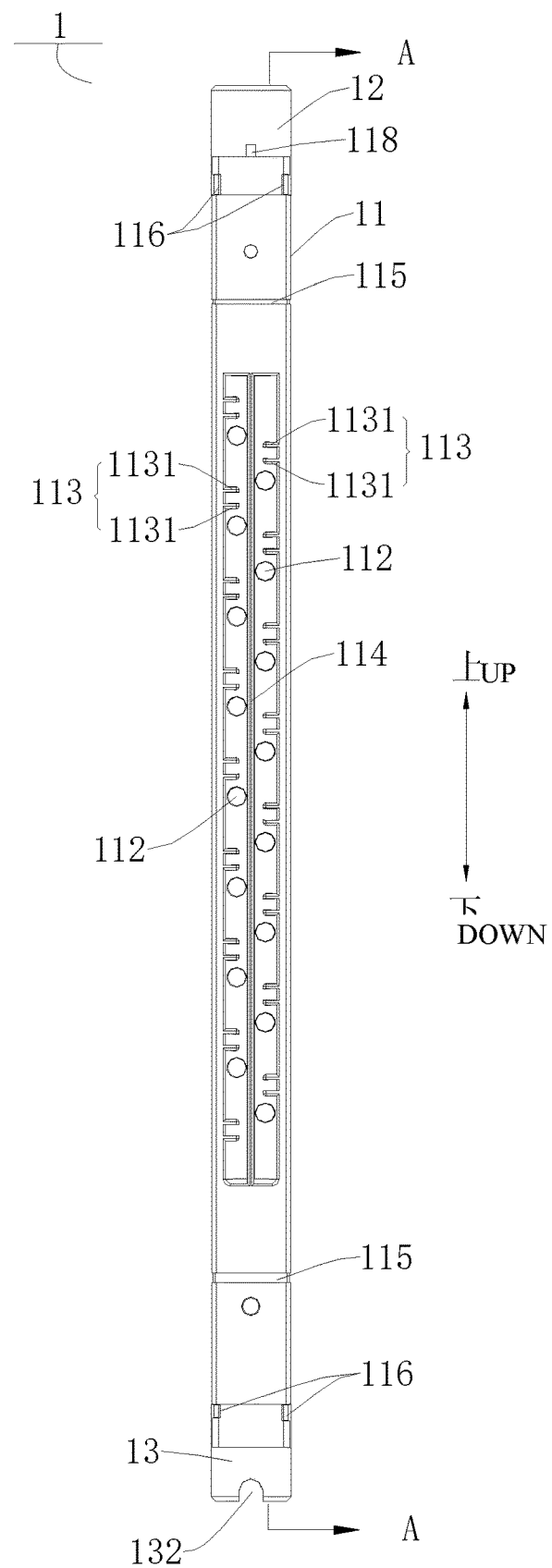
FIG. 2 is a schematic view of a first half-tube illustrated in FIG. 1.
Figure 3:
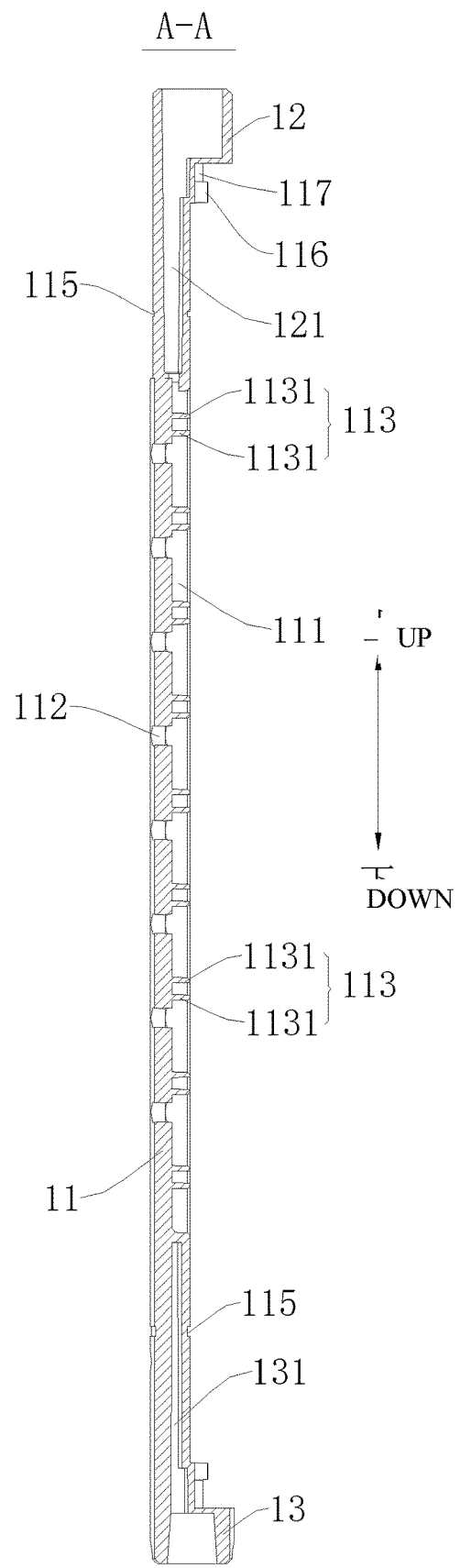
FIG. 3 is a sectional view taken along line A-A in FIG. 2.

Specifically, as shown in FIGS. 2 and 3, the first half-tube 1 has a first fitting surface extending along an axial direction of the first half-tube 1, and the first fitting surface is slotted to provide a first flow passage 111 extending along the axial direction, thus facilitating the mold making and production of the first half-tube 1. The first half-tube 1 has a first close end (for example, a lower end of the first half-tube 1 shown in FIG. 3) and a second end (for example, an upper end of the first half-tube 1 shown in FIG. 3) having a first through hole 121 communicated with the first flow passage 111, and a side wall of the first half-tube 1 has a first via hole 112 communicated with the first flow passage 111. Thus, a fluid can be collected through the first via hole 112, flow into the first flow passage 111, and finally flow out of the first through hole 121. Certainly, the fluid can also be collected through the first through hole 121, flow into the first flow passage 111, and finally flow out of the first via hole 112.

Figure 5:
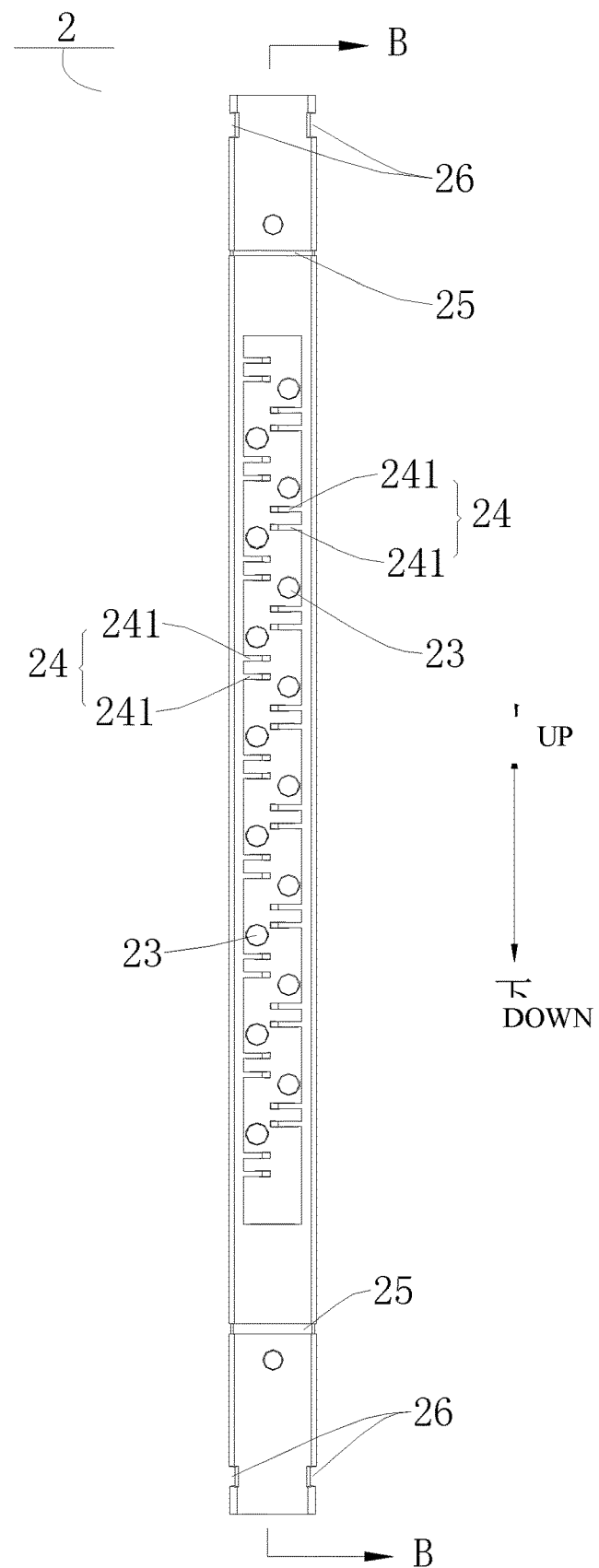
FIG. 5 is a schematic view of a second half-tube illustrated in FIG. 1.
Figure 6:
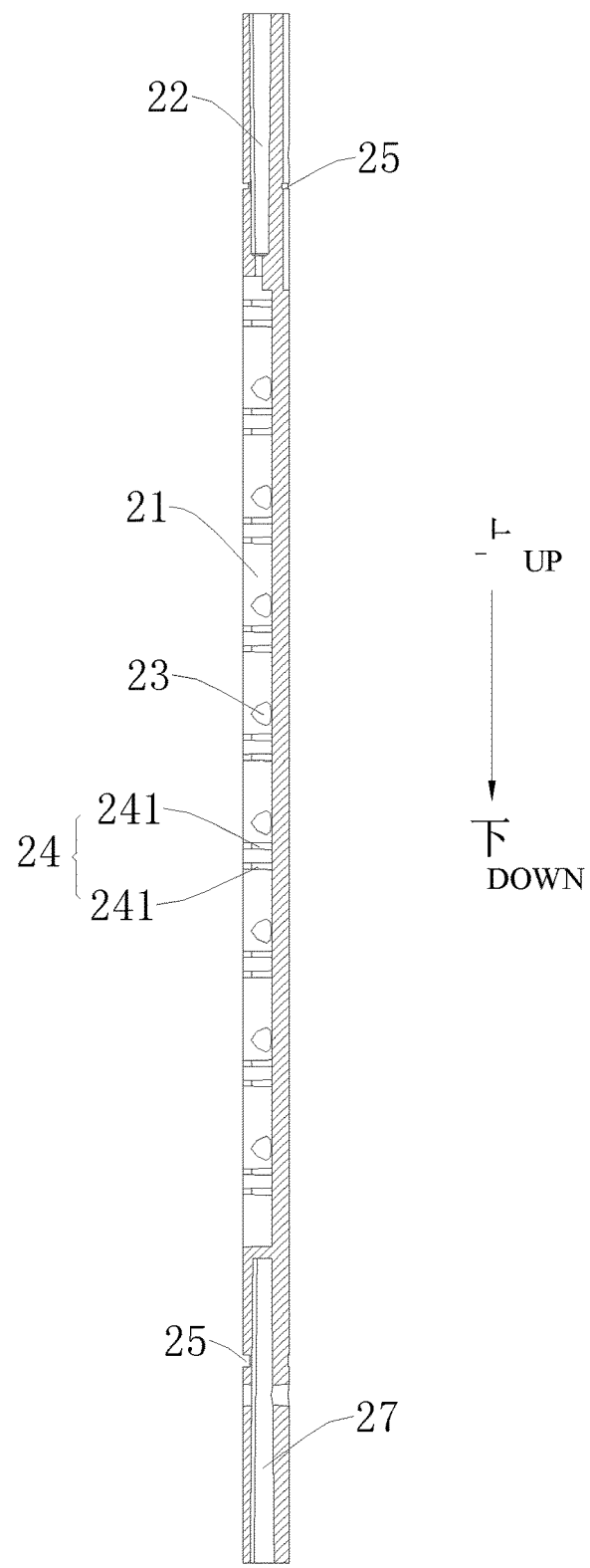
FIG. 6 is a sectional view taken along line B-B in FIG. 5.
Figure 7:
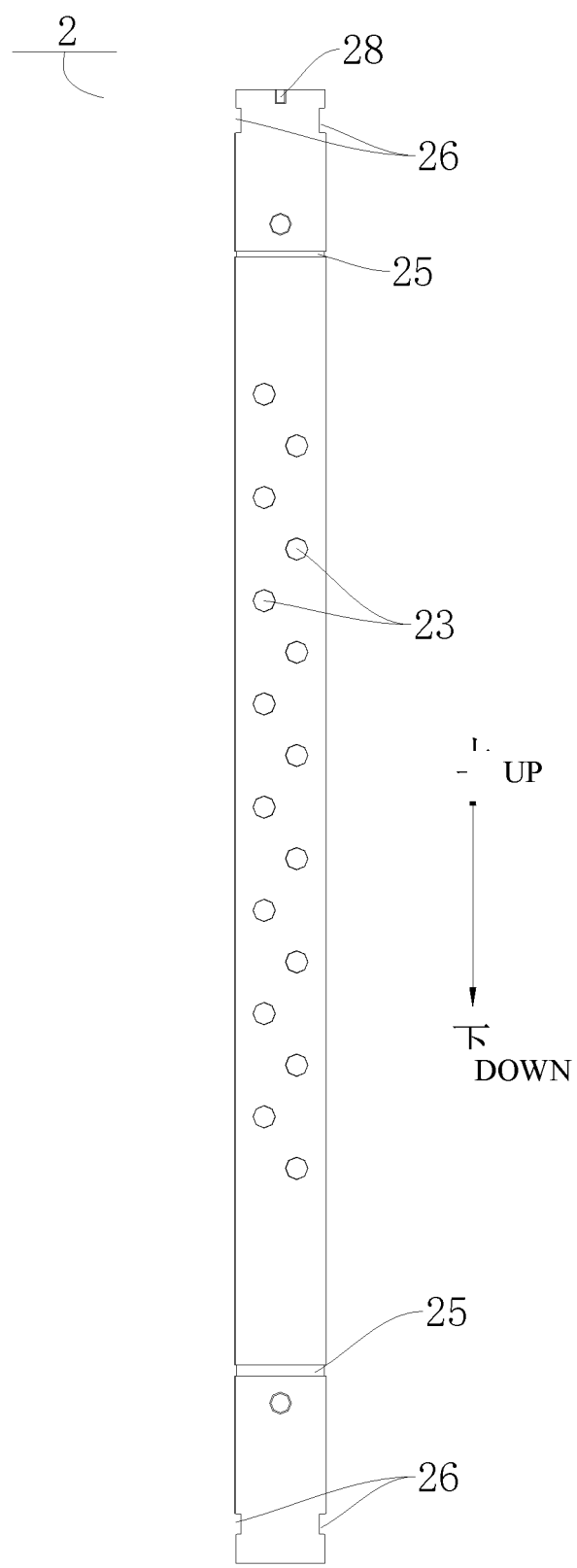
FIG. 7 is a schematic view of the second half-tube illustrated in FIG. 5 from another perspective.

As shown in FIGS. 5-7, the second half-tube 2 has a second fitting surface extending along an axial direction of the second half-tube 2, and the second fitting surface is slotted to provide a second flow passage 21 extending along the axial direction, thus facilitating the mold making and production of the second half-tube 2. The second half-tube 2 has a first close end (for example, a lower end of the second half-tube 2 shown in FIG. 6) and a second end (for example, an upper end of the second half-tube 2 shown in FIG. 6) having a second through hole 22 communicated with the second flow passage 21, and a side wall of second half-tube 2 has a second via hole 23 communicated with the second flow passage 21. Thus, a fluid can be collected through the second via hole 23, flow into the second flow passage 21, and finally flow out of the second through hole 22. Certainly, the fluid can also be collected through the second through hole 22, flow into the second flow passage 21, and finally flow out of the second via hole 23.

As shown in FIG. 1, the first half-tube 1 and the second half-tube 2 are butted, and the first fitting surface and the second fitting surface are opposite to each other, such that the first half-tube 1 and the second half-tube 2 are fitted to provide a hollow straight tube. The membrane element 3 is disposed between the first half-tube 1 and the second half-tube 2, and closes the first flow passage 111 and the second flow passage 21 respectively.

When the central tube 100 operates, one of the first half-tube 1 and the second half-tube 2 is used for collecting infiltration (such as a purified water after filtration), and the other of the first half-tube 1 and the second half-tube 2 is used for collecting a concentrate (such as impurities filtered out) or allowing an inflow of an unfiltered fluid (such as raw water). In the central tube 100, the raw water and the purified water each flow in a direction perpendicular to the first half-tube 1 and the second half-tube 2, so as to avoid negative effects caused by changes of the water flowing direction.

In the central tube 10 for the filter cartridge according to embodiments of the present disclosure, the first half-tube 1 and the second half-tube 2 are fitted to provide the central tube 100, and the fitting surfaces of the first half-tube 1 and the second half-tube 2 are slotted to define the first flow passage 111 and the second flow passage 21 correspondingly, thus simplifying the structure of the central tube 100, facilitating the mold making of the central tube 100, thereby achieving a mass production of the central tube 100.

In an embodiment of the present disclosure, referring to FIGS. 2 and 5, an inner surface of at least one of the first flow passage 111 and the second flow passage 21 may be provided with a reinforcing rib abutting against the membrane element 3, that is, the reinforcing rib abutting against the membrane element 3 may only be provided in the first flow passage 111, or the reinforcing rib abutting against the membrane element 3 may only be provided in the second flow passage 21, or the reinforcing rib abutting against the membrane element 3 may be provided in each of the first flow passage 111 and the second flow passage 21. Thus, the reinforcing rib can serve to support the membrane element 3 located between the fitting surfaces of the first half-tube 1 and the second half-tube 2, and also improve the strength of the first half-tube 1 and the second half-tube 2.

For example, in the examples illustrated in FIGS. 2 and 5, the inner surfaces of the first flow passage 111 and the second flow passage 21 each are provided with the reinforcing rib abutting against the membrane element 3, so as to support the membrane element 3 and improve the entire strength of the first half-tube 1 and the second half-tube 2.

In an embodiment of the present disclosure, as shown in FIG. 2, two sides of the inner surface of the first flow passage 111 are each provided with a plurality of first transverse reinforcing rib sets 113, in which the two sides are opposite to each other along a direction perpendicular to an axis of the first flow passage 111, and the plurality of first transverse reinforcing rib sets 113 on the two opposite sides of the inner surface of the first flow passage 111 may be staggeredly arranged. Thus, it is possible to fully support the membrane element 3 located between the first fitting surface and the second fitting surface, on the premise that the first flow passage 111 is ensured to be unblocked.

Furthermore, as shown in FIG. 2, the inner surface of the first flow passage 111 may be provided with an axial reinforcing rib 114 extending along the axial direction (for example, an up and down direction shown in FIG. 2) of the first half-tube 1, and the plurality of first transverse reinforcing rib sets 113 are arranged on two sides of the axial reinforcing rib 114. Thus, it is possible to further improve the support effect on the membrane element 3, and improve the strength of the first half-tube 1.

Preferably, a free end of the axial reinforcing rib 114 (for example, an inner end of the axial reinforcing rib 114 shown in FIG. 2) may have a rounded chamfer, such that the axial reinforcing rib 114 can reduce a flow resistance of the fluid in the first flow passage 111, ensure the first flow passage 111 to be unblocked, and also avoid damaging the membrane element 3, on the premise of supporting the membrane element 3.

Preferably, as shown in FIG. 2, each first transverse reinforcing rib set 113 may include two first transverse reinforcing ribs 1131, and a distance spaced by the two first transverse reinforcing ribs 1131 in the axis direction is not less than 2 millimeters. Thus, on the premise of ensuring the strength of the first half-tube 1, it is possible to reduce the flow resistance of the fluid in the first flow passage 111, ensure the first flow passage 111 to be unblocked, and also evenly support the membrane element 3, thereby allowing the membrane element 3 to be evenly stressed.

Preferably, as shown in FIG. 3, the first transverse reinforcing rib set 113 may be flush with the first fitting surface, and a free end of the first transverse reinforcing rib 1131 (for example, an inner end of the first transverse reinforcing rib 1131 shown in FIG. 2) has a rounded chamfer, such that, on the premise of supporting the membrane element 3, the first transverse reinforcing rib 1131 can avoid damaging the membrane element 3, and also allow the structure of the first half-tube 1 to be reasonable.

Preferably, the axial reinforcing rib 114 and the first transverse reinforcing rib 1131 each may have a thickness in a range from 1 millimeter to 2 millimeters, such that it is possible to reduce the flow resistance of the fluid in the first flow passage 111 and ensure the first flow passage 111 to be unblocked, on the premise of supporting the membrane element 3 and improving the strength of the first half-tube 1.

In an embodiment of the present disclosure, as shown in FIG. 2, the first via hole 112 is provided between each two adjacent first transverse reinforcing rib sets 113 in the axial direction (for example, the up and down direction shown in FIG. 2), thereby allowing the distribution of the first via holes 112 to be uniform and reasonable, on the premise of improving the strength of the first half-tube 1.

In an embodiment of the present disclosure, as shown in FIG. 5, two sides of the inner surface of the second flow passage 21 each are provided with a plurality of second transverse reinforcing rib sets 24, in which the two sides are opposite to each other along a direction perpendicular to an axis of the second flow passage 21, and the plurality of second transverse reinforcing rib sets 24 on the two opposite sides of the inner surface of the second flow passage 21 may be staggeredly arranged. Thus, it is possible to fully support the membrane element 3 located between the first fitting surface and the second fitting surface, on the premise of ensuring the second flow passage 21 to be unblocked.

Furthermore, as shown in FIG. 5, each second transverse reinforcing rib set 24 may include two second transverse reinforcing ribs 241, and a distance spaced by the two second transverse reinforcing ribs 241 in the axis direction is not less than 2 millimeters. Thus, on the premise of ensuring the strength of the second half-tube 1, it is possible to reduce the flow resistance of the fluid in the second flow passage 21, ensure the second flow passage 21 to be unblocked, and also evenly support the membrane element 3, thereby allowing the membrane element 3 to be evenly stressed.

Preferably, as shown in FIG. 6, the second transverse reinforcing rib set 24 may be flush with the second fitting surface, and a free end of the second transverse reinforcing rib 241 (for example, an inner end of the second transverse reinforcing rib 241 shown in FIG. 5) may have a rounded chamfer. Thus, on the premise of supporting the membrane element 3, the second transverse reinforcing rib 241 can avoid damaging the membrane element 3, and also allow the structure of the second half-tube 2 to be reasonable.

Preferably, the second transverse reinforcing rib 241 may have a thickness in a range from 1 millimeter to 2 millimeters, such that it is possible to reduce the flow resistance of the fluid in the second flow passage 21 and ensure the second flow passage 21 to be unblocked, on the premise of supporting the membrane element 3 and improving the strength of the second half-tube 2.

In an embodiment of the present disclosure, as shown in FIG. 5, the second via hole 23 is provided between each two adjacent second transverse reinforcing rib sets 24 in the axial direction (for example, the up and down direction shown in FIG. 5), thereby allowing the distribution of the second via holes 23 to be uniform and reasonable, on the premise of improving the strength of the second half-tube 2.

In an embodiment of the present disclosure, as shown in FIG. 1, two ends of the first half-tube 1 each may be provided with a first process positioning groove 115 extending along a circumferential direction of the first half-tube 1, the first flow passage 111 is located between the two first process positioning grooves 115; two ends of the second half-tube 2 each are provided with a second process positioning groove 25 extending along a circumferential direction of the second half-tube 2, the second flow passage 21 is located between the two second process positioning grooves 25. When the first half-tube 1 and the second half-tube 2 are assembled together, the first process positioning groove 115 is flush with the second process positioning groove 25. Thus, by using the first process positioning groove 115 and the second process positioning groove 25 for positioning, it is possible to facilitate rolling of the membrane element 3, improve the rolling efficiency of the membrane element 3, and also limit a final dimension of the membrane element 3. In addition, after the membrane element 3 completes its rolling, excessive parts of the central tube 100 can be cut off along the first process positioning groove 115 and the second process positioning groove 25, and thereby a next assembling step can be entered.

Furthermore, as shown in FIGS. 2 and 5, a distance between each of the two ends of the first flow passage 111 and the corresponding first process positioning grooves 115 may be in a range from 10 millimeters to 20 millimeters, and a distance between each of the two ends of the second flow passage 21 and the corresponding second process positioning grooves 25 may be in a range from 10 millimeters to 20 millimeters, thus improving the strength of the first half-tube 1 and the second half-tube 2, and also allowing the structures of the first half-tube 1 and the second half-tube 2 to be reasonable.

Herein, it should be noted that, during the assembling process, after the membrane element 3 is rolled, two ends above and below the first process positioning groove 115 and the second process positioning groove 25 are necessary to be cut off, so as to perform the assembling. Thus, by reserving a certain gap distance between the first process positioning groove 115 and the first flow passage 111 and another certain gap distance between the second process positioning groove 25 and the second flow passage 21, it is possible to improve the strength of ends of the first half-tube 1 and the second half-tube 2 after being cut, thereby improving the service life of the central tube 100.

In an embodiment of the present disclosure, referring to FIGS. 2 and 5, a section of at least part of any one of the first half-tube 1 and the second half-tube 2 may have a semicircle shape, that is, the section of the first half-tube 1 may be partially semicircle-shaped, or may be entirely semicircle-shaped; the second of the second half-tube 2 may be partially semicircle-shaped, or may be entirely semicircle-shaped. The first via hole 112 may be disposed in an arc surface of the first half-tube 1, and the second via hole 23 may be disposed in an arc surface of the second half-tube 2. Thus, with the first half-tube 1 being fitted with the second half-tube 2, the central tube 100 can be configured as a hollow straight tube.

For instance, in examples shown in FIGS. 2 and 5, a middle segment of the first half-tube 1 has a semicircle-shaped section, and the section of the entire second half-tube 2 has a semicircle shape. When the semicircle-shaped sections of the first half-tube 1 and the second half-tube 2 are fitted with each other, a circle structure can be provided, which is similar to the structure of a traditional cylindrical central tube 100, such that the assembling is facilitated, and it is convenient to fit with other components of the traditional structure.

In an embodiment of the present disclosure, as shown in FIG. 1, the two ends of the first half-tube 1 may be provided with a first upper fitting part and a first lower fitting part correspondingly, and the two ends of the second half-tube 2 may be provided with a second upper fitting part and a second lower fitting part correspondingly. The first upper fitting part may be snap-fitted with the second upper fitting part correspondingly, and the first lower fitting part may be snap-fitted with the second lower fitting part correspondingly, such that the first half-tube 1 can be assembled with the second half-tube 2, improving the assembling efficiency and the assembling accuracy of the first half-tube 1 with the second half-tube 2.

Furthermore, as shown in FIG. 1, the first upper fitting part and the first lower fitting part each may include two locking protrusions 116 arranged at intervals in the direction perpendicular to the axis of the first half-tube 1, and the second upper fitting part and the second lower fitting part each may include two locking grooves 26 on two sides of the second half-tube, in which the two sides of the second half-tube are defined in the direction perpendicular to the axis of the second half-tube. Thus, by the locking protrusion 116 being fitted with the locking groove 26, it is possible to further improve the assembling accuracy and the assembling efficiency of the first half-tube 1 with the second half-tube 2, and also to improve the reliability of connection between the first half-tube 1 and the second half-tube 2.

Preferably, referring to FIG. 1, dimensions of the first upper fitting part and the first lower fitting part in the axis direction (for example, the up and down direction shown in FIG. 1) may be different, thereby achieving the fool-proof when the first half-tube 1 and the second half-tube 2 are assembled, and avoiding the misassembling of the first upper fitting part and the first lower fitting part.

Optionally, as shown in FIGS. 2 and 5, the first upper fitting part may be provided with a first groove 118, and the second upper fitting part may be provided with a second groove 28, such that it is convenient to quickly recognize the first upper fitting part and the first lower fitting part, as well as the second upper fitting part and the second lower fitting part during the assembling, thereby preventing the misassembling, and improving the assembling efficiency.

In an embodiment of the present disclosure, as shown in FIG. 1, the two ends of the first half-tube 1 in the axial direction each may be provided with a boss 117 protruding from the first fitting surface, and the first upper fitting part and the first lower fitting part each are arranged at the boss 117. Thus, a gap can be formed between the first half-tube 1 and the second half-tube 2 after the first half-tube 1 and the second half-tube 2 are fitted with each other, such that it is convenient to arrange the membrane element 3.

Preferably, as shown in FIG. 1, in the direction perpendicular to the axis of the first half-tube 1, a height by which the locking protrusion 116 protrudes beyond the boss 117 may be in a range from 1 millimeter to 2 millimeters, thus preventing the gap between the first fitting surface and the second fitting surface from being too large, on the premise of providing the assembling gap for the membrane element 3, thereby allowing the structure of the central tube 100 to be reasonable.

In an embodiment of the present disclosure, as shown in FIG. 1, the first half-tube 1 may include a main body 11, as well as a first columnar body 12 and a second columnar body 13 disposed at two ends of the main body 11 correspondingly. The first columnar body 12 may define the first through hole 121 therein, and the second half-tube 2 may be fitted with the main body 11 and located between the first columnar body 12 and the second columnar body 13. Thus, when rolling the membrane element 3, the central tube 100 can be steadily mounted to a film rolling machine through the first columnar body 12 and the second columnar body 13, thereby achieving a mechanized production of the rolling of the membrane element 3, and hence improving the production efficiency.

Figure 4:
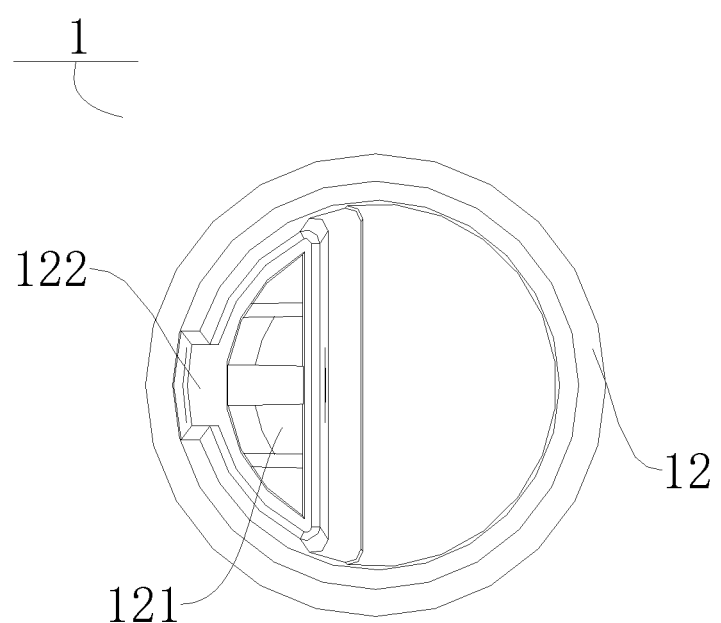
FIG. 4 is a top view of the first half-tube illustrated in FIG. 2.

Furthermore, as shown in FIG. 4, an inner circumferential wall surrounding the first through hole 121 may be provided with a positioning groove 122 extending along the axial direction of the first through hole 121, such that during a process of mounting the first half-tube 1 with other components such as a joint, the positioning groove 122 facilitates the positioning during the connection, and may also be used to distinguish from the second half-tube 2 and hence be recognized, thus preventing the misassembling.

In an embodiment of the present disclosure, as shown in FIGS. 3 and 6, the first close end of the first half-tube 1 (for example, a lower end of the first half-tube 1 shown in FIG. 3) may be provided with a first positioning hole 131 extending in the axial direction (for example, the up and down direction shown in FIG. 3) and spaced apart from the first flow passage 111, the first close end of the second half-tube 2 (for example, a lower end of the second half-tube 2 shown in FIG. 6) may be provided with a second positioning hole 27 extending in the axial direction (for example, the up and down direction shown in FIG. 6) and spaced apart from the second flow passage 21. Thus, with the first positioning hole 131 and the second positioning hole 27 being fitted with external elements, it is possible to fix the central tube 100, and improve the reliability in mounting the central tube 100.

Optionally, as shown in FIG. 2, the first close end of the first half-tube 1 (for example, the lower end of the first half-tube 1 shown in FIG. 2) may also be provided with a tooling bayonet 132. Thus, when rolling the membrane element 3, the tooling bayonet 132 can be used for the connection of the central tube 100 with the film rolling machine, thereby fixing the central tube 100 to the film rolling machine and transmitting the rolling power.

In some embodiments of the present disclosure, after the membrane element 3 is rolled, the central tube 100 according to embodiments of the present disclosure may be cut along the first process positioning groove 115 and the second process positioning groove 25. For example, FIG. 1 schematically illustrates the central tube 100 before being cut, and FIGS. 8-10 are schematic views of the central tube 100, in which the central tube 100 has been cut along the first process positioning groove 115 and the second process positioning groove 25 after the membrane element 3 is rolled.

Figure 8:
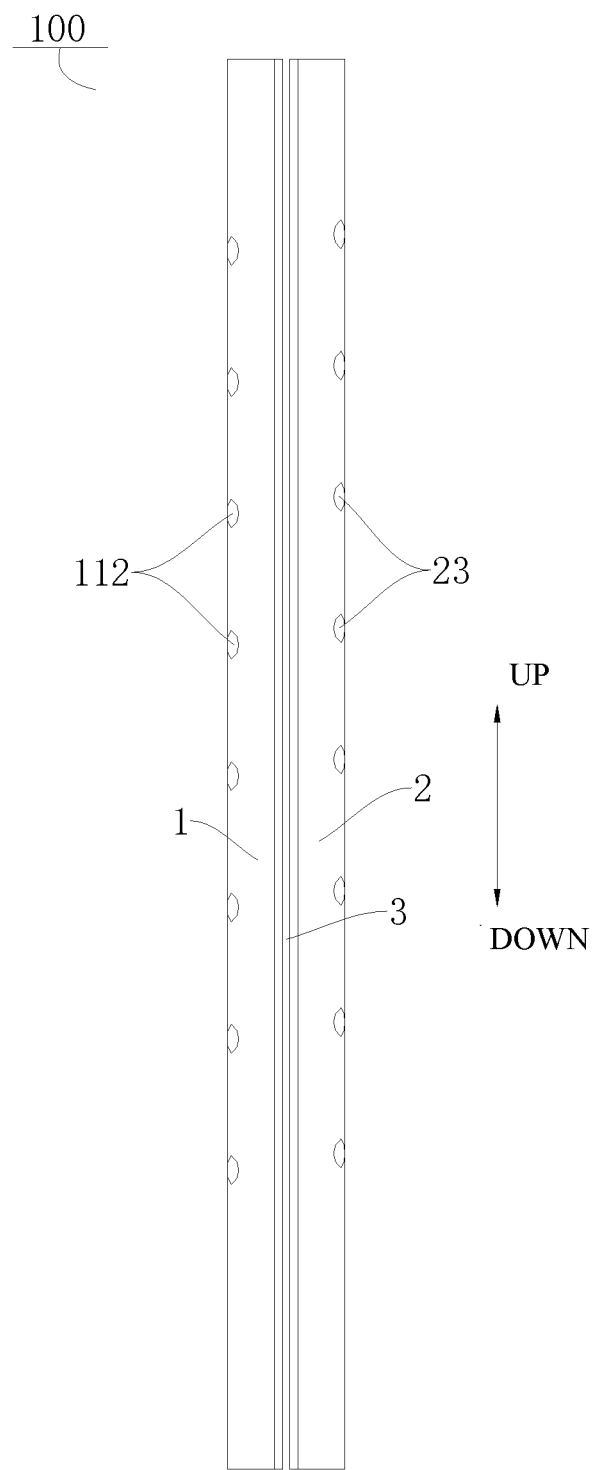
FIG. 8 is a schematic view of the central tube illustrated in FIG. 1, in which the central tube is cut along a first process positioning groove and a second process positioning groove.
Figure 9:
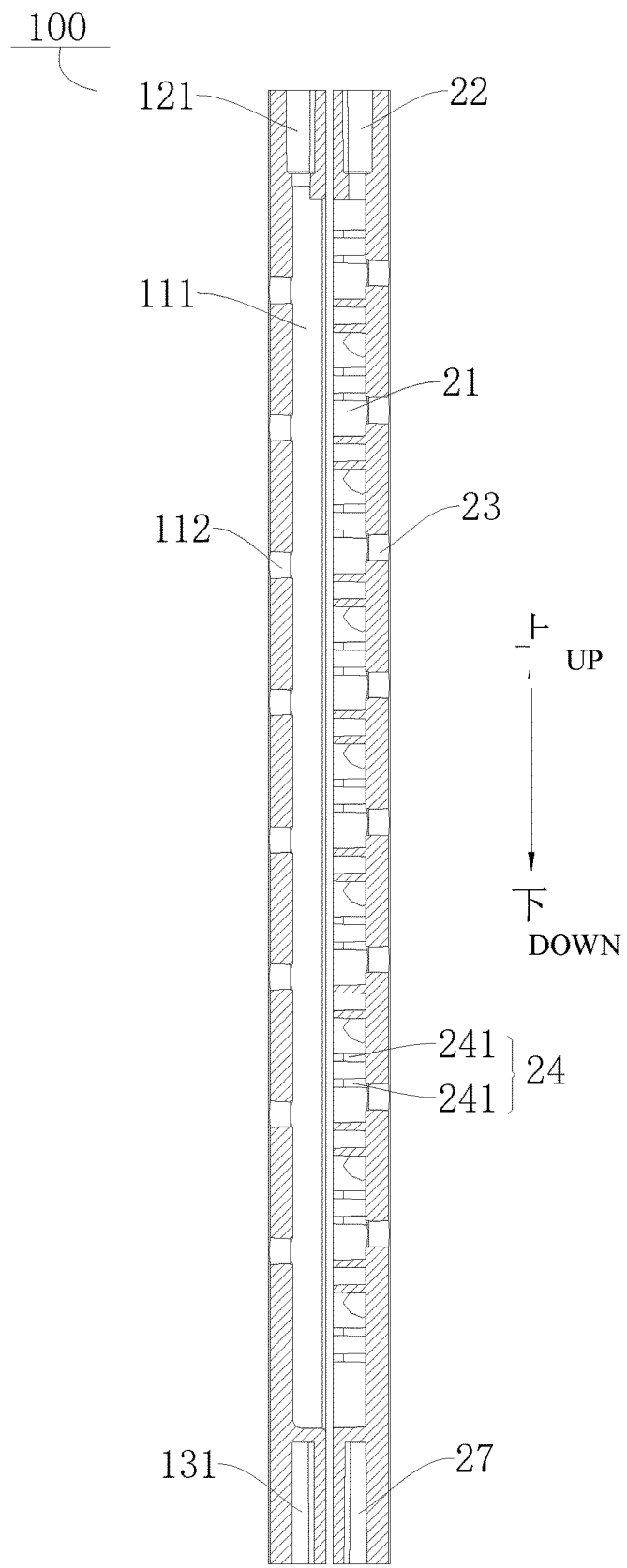
FIG. 9 is a sectional view of the central tube illustrated in FIG. 8.
Figure 10:
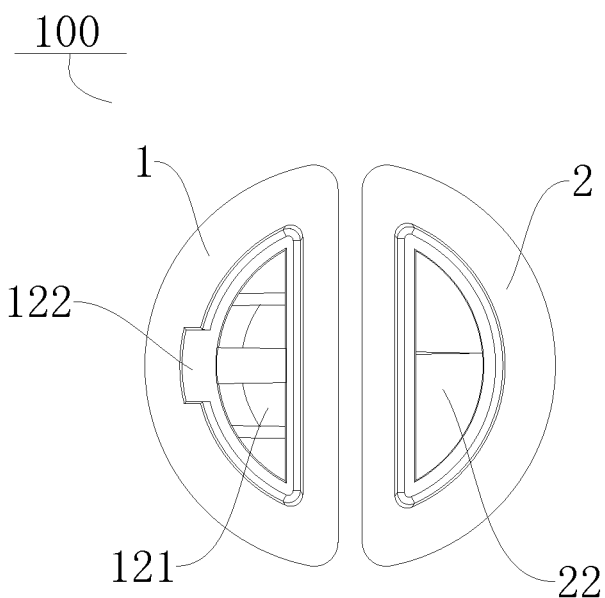
FIG. 10 is a top view of the central tube illustrated in FIG. 8.

Specifically, referring to FIGS. 8-10, the membrane element 3 is located between the first fitting surface and the second fitting surface, and separates the first flow passage 111 from the second flow passage 21, in which the first flow passage 111 is communicated with the first through hole 121 and the first via hole 112 respectively, and the second flow passage 21 is communicated with the second via hole 23 and the second through hole 22 respectively. One of the first flow passage 111 and the second flow passage 21 collects the infiltration, and the other one of the first flow passage 111 and the second flow passage 21 collects concentrate or makes the unfiltered fluid flow into the membrane element 3. The positioning groove 122 is provided in the first through hole 121 after the cutting, so as to distinguish the first half-tube 1 from the second half-tube 2; after the cutting, the first through hole 121 and the second through hole 22 may be connected to external fluid elements, so as to extend the flow passage, and may also be used to fix the central tube 100; after the cutting, the first positioning hole 131 and the second positioning hole 27 may be fitted with the external elements, so as to fix the central tube 100.

A filtering device according to embodiments of a second aspect of the present disclosure includes an upper-end cover 200, a lower-end cover 300 and the central tube 100 for the filter cartridge according to embodiments of the first aspect of the present disclosure.

Figure 12:
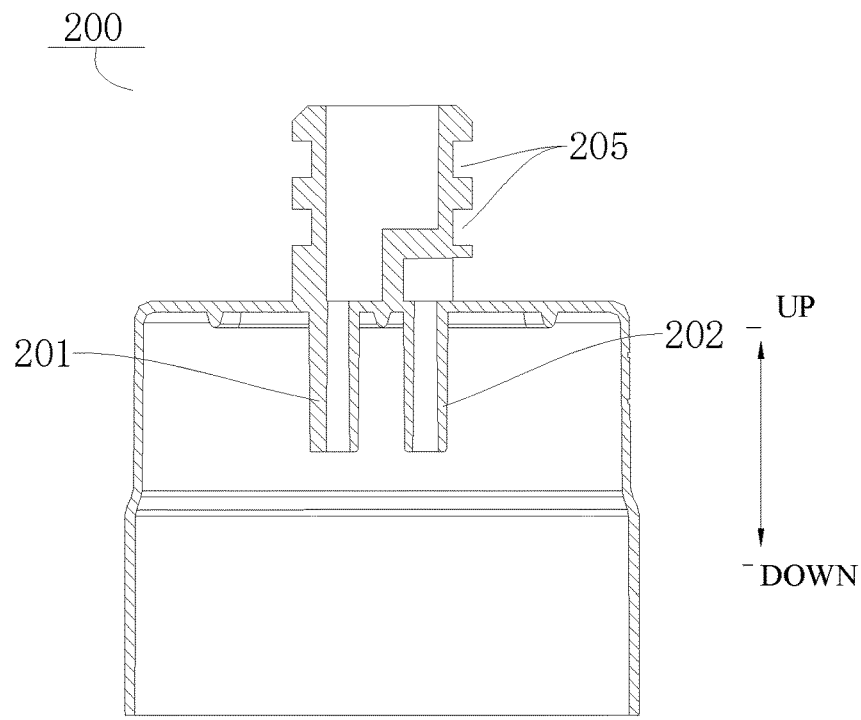
FIG. 12 is a sectional view of the upper-end cover illustrated in FIG. 11.

Specifically, as shown in FIG. 12, the upper-end cover 200 is provided with a first guiding tube 201 and a second guiding tube 202. The upper-end cover 200 is connected to the second end of the first half-tube 1 (for example, the upper end of the first half-tube 1 shown in FIG. 9) and the second end of the second half-tube 2 (for example, the upper end of the second half-tube 2 shown in FIG. 9), the first guiding tube 201 is inserted in the first through hole 121, and the second guiding tube 202 is inserted in the second through hole 22. Thus, with the upper-end cover 200, it is not only possible to extend the first flow passage 111 of the first half-tube 1 and the second flow passage 21 of the second half-tube 2, but also possible to fix and limit the positions of the first half-tube 1 and the second half-tube 2 in relative to the membrane element 3. The second ends of the first half-tube 1 and the second half-tube 2 (for example, lower ends of the first half-tube 1 and the second half-tube 2 shown in FIG. 9) are connected to the lower-end cover 300, so as to fix the central tube 100.

By providing the central tube 100 for the filter cartridge according to embodiments of the first aspect of the present disclosure in the filtering device according to embodiments of the present disclosure, the overall properties of the filtering device are improved.

Figure 13:
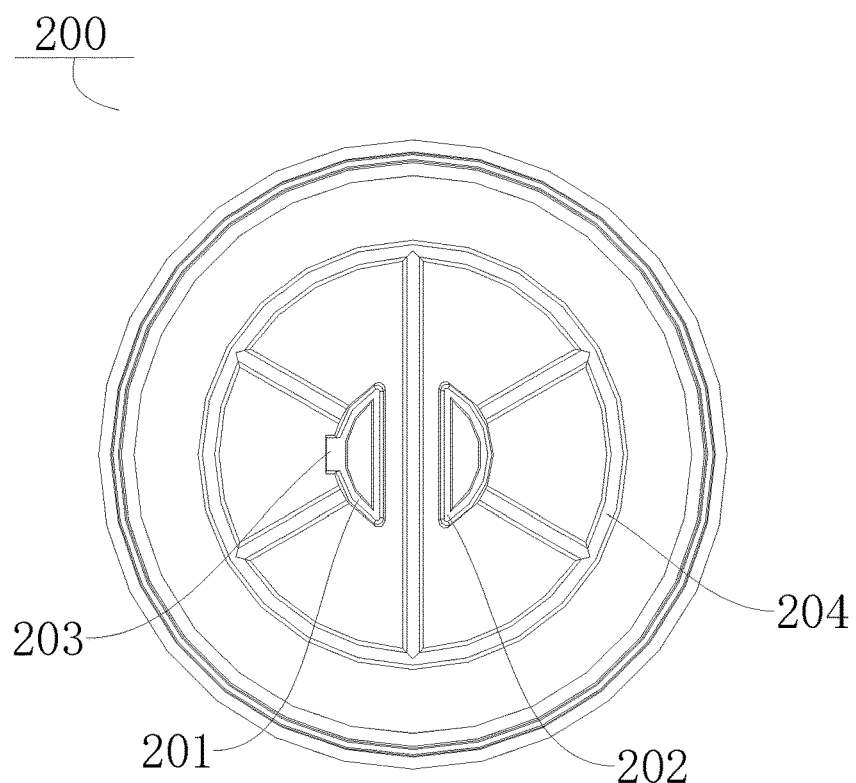
FIG. 13 is a bottom view of the upper-end cover illustrated in FIG. 11.

In an embodiment of the present disclosure, as shown in FIG. 13, an outer circumferential wall of the first guiding tube 201 may be provided with a positioning flange 203, which is fitted with the positioning groove 122 in the first through hole 121 and is positioned thereby. With the close fit between the positioning flange 203 and the positioning groove 122, a fool-proof structure can be provided, so as to quickly recognize the first through hole 121 and the second through hole 22 during the operation, thereby preventing the misassembling and also improving the assembling efficiency.

Optionally, as shown in FIG. 13, a top wall of the upper-end cover 200 may be provided with a first position limiting rib 204. The first position limiting rib 204 can be used for limiting a sealing glue, thereby ensuring a sealing performance when the membrane element 3 is fitted with the upper-end cover 200, while improving the efficiency of a sealing process of the membrane element 3.

Figure 11:
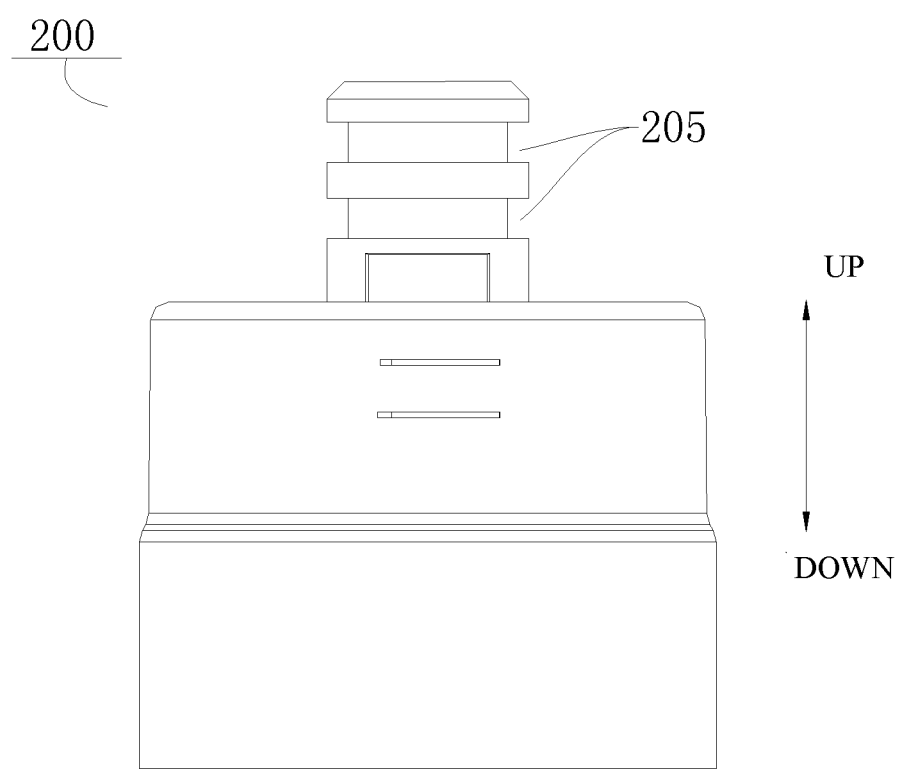
FIG. 11 is a schematic view of an upper-end cover of a filtering device according to embodiments of the present disclosure.

Optionally, as shown in FIG. 11, an outer circumferential wall of an upper portion of the upper-end cover 200 may be provided with an annular sealing groove 205 for convenience of assembling.

In an embodiment of the present disclosure, referring to FIG. 9 in combination with FIG. 5, the first close end of the first half-tube 1 (for example, the lower end of the first half-tube 1 shown in FIG. 9) may be provided with the first positioning hole 131 extending in the axial direction (for example, the up and down direction shown in FIG. 9) and spaced apart from the first flow passage 111, the first close end of the second half-tube 2 (for example, the lower end of the second half-tube 2 shown in FIG. 9) is provided with the second positioning hole 27 extending in the axial direction (for example, the up and down direction shown in FIG. 9) and spaced apart from the second flow passage 21. The lower-end cover 300 is provide with a first positioning tube 301 and a second positioning tube 302, the first positioning tube 301 is inserted in the first positioning hole 131, and the second positioning tube 302 is inserted in the second positioning hole 27. Thus, it is not only possible to enable the lower-end cover 300 to be closely fitted with the first half-tube 1 and the second half-tube 2, but also possible to play a role of limiting and fixing the central tube 100.

Figure 14:
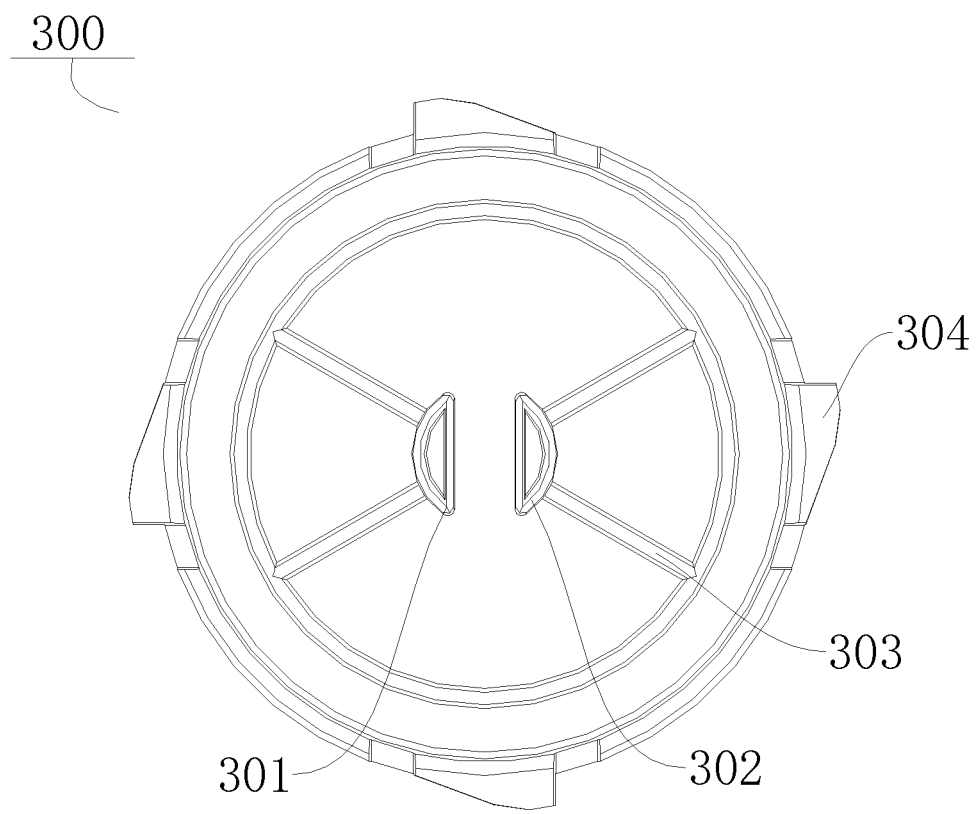
FIG. 14 is a schematic view of a lower-end cover of a filtering device according to embodiments of the present disclosure.

Furthermore, as shown in FIG. 14, the first positioning tube 301 and the second positioning tube 302 may be symmetrical with respect to a center of the lower-end cover 300. Thus, when assembling the lower-end cover 300, the first positioning tube 301 can also be inserted in the second positioning hole 27, the second positioning tube 302 can also be inserted in the first positioning hole 131, thereby improving the assembling efficiency.

In an embodiment of the present disclosure, as shown in FIG. 14, a bottom wall of the lower-end cover 300 may be provided with a plurality of second position limiting ribs 303. The second position limiting ribs 303 can be used for limit a sealing glue, thereby ensuring the sealing performance when the membrane element 3 is fitted with the lower-end cover 300, while improving the efficiency of the sealing process of the membrane element 3.

In an embodiment of the present disclosure, as shown in FIG. 14, an outer circumferential wall of the lower-end cover 300 is provided with a plurality of elastic positioning members 304, and the plurality of elastic positioning members 304 are evenly arranged in a circumferential direction of the lower-end cover 300 and spaced apart from one another. The elastic positioning member 304 has a capacity of certain transverse elastic deformation, thereby ensuring the assemblability of the lower-end cover 300.

The filtering device according to a specific embodiment of the present disclosure will be described herein with reference to FIGS. 1-15.

The filtering device includes the central tube 100, the upper-end cover 200 and the lower-end cover 300.

Specifically, as shown in FIG. 1, the central tube 100 is configured as a cylinder structure constituted by the first half-tube 1 and the second half-tube 2, and the membrane element 3 is disposed between the first half-tube 1 and the second half-tube 2.

As shown in FIG. 2, the first half-tube 1 includes the main body 11 and the first columnar body 12 and the second columnar body 13 disposed at two ends of the main body 11 correspondingly. The section of the first half-tube 1 has a semicircle shape, and the first half-tube 1 has the first fitting surface extending along the axial direction of the first half-tube 1. The first fitting surface is slotted to provide the first flow passage 111 extending along the axial direction. The inner surface of the first flow passage 111 is provided with the axial reinforcing rib 114 and the plurality of first transverse reinforcing rib sets 113. The plurality of first transverse reinforcing rib sets 113 are staggeredly arranged along the two sides of the axial reinforcing rib 114. Each first transverse reinforcing rib set 113 includes two first transverse reinforcing ribs 1131 arranged adjacent to each other, and the distance between the two first transverse reinforcing ribs 1131 is not less than 2 mm. The width of the first transverse reinforcing rib 1131 and the width of the axial reinforcing rib 114 each are in a range from 1 mm to 2 mm, and the free ends of the first transverse reinforcing rib 1131 and the axial reinforcing rib 114 each have a rounded chamfer.

As shown in FIGS. 2-4, the side wall of the first half-tube 1 is provided with the first via hole 112 between each two adjacent first transverse reinforcing rib sets 113, and the first via hole 112 is communicated with the first flow passage 111. The upper end of the first half-tube 1 is provided with the first through hole 121 penetrating the first columnar body 12 and communicated with the first flow passage 111. The inner circumferential wall of the first through hole 121 is provided with the positioning groove 122 extending along the axial direction of the first through hole 121. The lower end of the first half-tube 1 is provided with the first positioning hole 131 spaced apart from the first flow passage 111, and the lower end of the first half-tube 1 is further provided with the tooling bayonet 132 which is configured to mount the central tube 100 to the film rolling machine.

As shown in FIGS. 2 and 3, two ends of the first half-tube 1 each are provided with the first process positioning groove 115 extending along the circumferential direction of the first half-tube 1. The first flow passage 111 is located between the two first process positioning grooves 115, and the distance between each of the two ends of the first flow passage 111 and the corresponding first process positioning groove 115 is in a range from 10 mm to 20 mm. Two ends of the main body 11 each are provided with the boss 117 protruding beyond the first fitting surface. The first upper fitting part and the first lower fitting part are provided to the bosses 117 at the upper and lower ends correspondingly. The first upper fitting part and the first lower fitting part each are provided with two locking protrusions 116 arranged at intervals, the height by which the locking protrusion 116 protrudes beyond the boss 117 is in a range from 1 mm to 2 mm, and the dimension of the locking protrusion 116 of the first upper fitting part and the dimension of the locking protrusion 116 of the first lower fitting part are different. The first upper fitting part is further provided with the first groove 118 for convenience of quick recognition and assembling.

As shown in FIGS. 5-7, the section of the second half-tube 2 has a semicircle shape, and the second half-tube 2 has the second fitting surface extending along the axial direction of the second half-tube 2. The second fitting surface is slotted to provide the second flow passage 21 extending along the axial direction. The inner surface of the second flow passage 21 is provided with the plurality of second transverse reinforcing rib sets 24. The plurality of second transverse reinforcing rib sets 24 are staggeredly arranged along the two sides opposite in the direction perpendicular to the axis. Each second transverse reinforcing rib set 24 includes two second transverse reinforcing ribs 241 arranged adjacent to each other, and the distance between the two second transverse reinforcing ribs 241 is not less than 2 mm. The width of the second transverse reinforcing rib 241 is in a range from 1 mm to 2 mm, and the free end of the second transverse reinforcing rib 241 has the rounded chamfer.

As shown in FIG. 6, the side wall of the second half-tube 2 is provided with the second via hole 23 between each two adjacent second transverse reinforcing rib sets 24, and the second via hole 23 is communicated with the second flow passage 21. The upper end of the second half-tube 2 is provided with the second through hole 22 communicated with the second flow passage 21. The lower end of the second half-tube 2 is provided with the second positioning hole 27 spaced apart from the second flow passage 21.

As shown in FIG. 5, two ends of the second half-tube 2 each are provided with the second process positioning groove 25 extending along the circumferential direction of the second half-tube 2 and opposed to the first process positioning grooves 115. The second flow passage 21 is located between the two second process positioning grooves 25, and the distance between each of the two ends of the second flow passage 21 and the corresponding second process positioning grooves 25 is in a range from 10 to 20. The two ends of the second half-tube 2 are provided with the second upper fitting part and the second lower fitting part correspondingly. The second upper fitting part and the second lower fitting part each are provided with the locking groove 26 configured to be snap-fitted with the locking protrusion 116. As shown in FIG. 7, the second upper fitting part is further provided with the second groove 28 for convenience of quick recognition and assembling.

As shown in FIGS. 11-13, the top wall of the upper-end cover 200 is provided with the first guiding tube 201 and the second guiding tube 202 extending downwards, the outer circumferential wall of the first guiding tube 201 is provided with the positioning flange 203. The top wall of the upper-end cover 200 is further provided with the first position limiting rib 204 for limiting the sealing glue. The outer circumferential wall of the upper-end cover 200 is provided with the annular sealing groove 205 for convenience of assembling.

Figure 15:
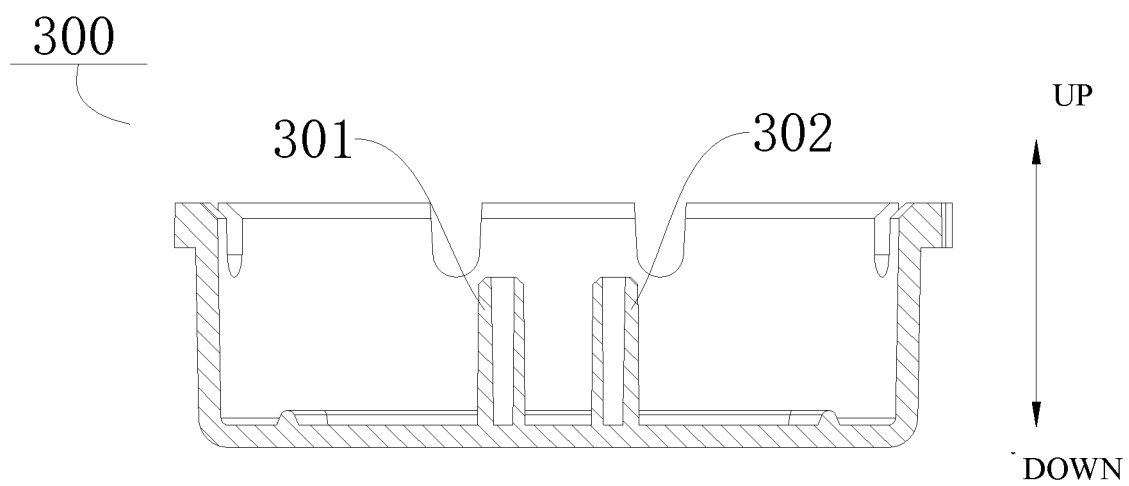
FIG. 15 is a sectional view of the lower-end cover illustrated in FIG. 14.

As shown in FIGS. 14 and 15, the bottom wall of the lower-end cover 300 is provided with the first positioning tube 301 and the second positioning tube 302 extending upwards. The first positioning tube 301 and the second positioning tube 302 are symmetrical with respect to the center. The bottom wall of the lower-end cover 300 is provided with the plurality of second position limiting ribs 303 for limiting the sealing glue. The outer circumferential wall of the lower-end cover 300 is provided with the plurality of elastic positioning members 304 which can ensure the assemblability of the lower-end cover 300.

During the assembling, the first upper fitting part is snap-fitted with the second upper fitting part and the first lower fitting part is snap-fitted with the second lower fitting part firstly, and in this case, the first process positioning groove 115 is flush with the second process positioning groove 25. The first half-tube 1 and the second half-tube 2 are mounted to the film rolling machine. The membrane element 3 is rolled between the first fitting surface and the second fitting surface, and the membrane element 3 is totally covered between the first process positioning groove 115 and the second process positioning groove 25. After the rolling of the membrane element 3 is completed, the central tube 100 is cut along the first process positioning groove 115 and the second process positioning groove 25. FIGS. 8-10 are schematic views of the central tube 100, in which the central tube 100 has been cut after the rolling of the membrane element 3 is completed.

The top wall of the upper-end cover 200 and the bottom wall of the lower-end cover 300 are filled with the sealing glue, and the first guiding tube 201 and the second guiding tube 202 of the upper-end cover 200 are correspondingly inserted in the first through hole 121 and the second through hole 22 shown in FIG. 9. In this case, the positioning flange 203 outside the first guiding tube 201 is fitted with the positioning groove 122 inside the first through hole 121, and the upper-end cover 200 is fixed to the central tube 100 by the sealing glue, thus completing the sealing process of the upper end of the membrane element 3. The first positioning tube 301 and the second positioning tube 302 of the lower-end cover 300 are correspondingly inserted in the first positioning hole 131 and the second positioning hole 27 shown in FIG. 9, and the lower-end cover 300 is fixed to the central tube 100 by the sealing glue, thereby completing the sealing process of the lower end of the membrane element 3.

In the filtering device according to embodiments of the present disclosure, by adopting the central tube 100 constituted by the first half-tube 1 and the second half-tube 2, it is possible to simplify the structure of the central tube 100, facilitate the mold making of the central tube 100, and achieve the mass production of the central tube 100, thereby improving the production efficiency of the central tube 100. In addition, the central tube 100 according to the present disclosure is suitable to be mounted to the film rolling machine, thereby achieving the mechanized production of the rolling of the membrane element 3, and hence improving the rolling efficiency of the membrane element 3.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "axial," "radial," and "circumferential" should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A central tube for a filter cartridge, comprising:
a first half-tube having a first fitting surface extending along an axial direction of the first half-tube, and the first fitting surface being slotted to provide a first flow passage extending along the axial direction, the first half-tube having a first closed end and a second end having a first through hole communicated with the first flow passage, a side wall of the first half-tube having a first via hole communicated with the first flow passage;
a second half-tube having a second fitting surface extending along an axial direction of the second half-tube, and the second fitting surface being slotted to provide a second flow passage extending along the axial direction, the second half-tube having a first closed end and a second end having a second through hole communicated with the second flow passage, a side wall of second half-tube having a second via hole communicated with the second flow passage, the first half-tube and the second half-tube being butted, the first fitting surface and the second fitting surface being opposite to each other, the first half-tube and the second half-tube being fitted to provide a hollow straight tube; and a membrane element disposed between the first half-tube and the second half-tube, and closing the first flow passage and the second flow passage respectively, wherein an inner surface of at least one of the first flow passage and the second flow passage is provided with a reinforcing rib abutting against the membrane element, and two sides of the inner surface of the first flow passage are each provided with a plurality of first transverse reinforcing rib sets, and the two sides of the inner surface of the first flow passage are opposite to each other along a direction perpendicular to an axis of the first flow passage, and the plurality of first transverse reinforcing rib sets on the two opposite sides of the inner surface of the first flow passage are staggeredly arranged.

2. The central tube for the filter cartridge according to claim 1, wherein the inner surface of the first flow passage is provided with an axial reinforcing rib extending along the axial direction of the first half-tube, and the plurality of first transverse reinforcing rib sets are arranged on two sides of the axial reinforcing rib.

3. The central tube for the filter cartridge according to claim 1, wherein each first transverse reinforcing rib set comprises two first transverse reinforcing ribs, and a distance spaced by the two first transverse reinforcing ribs in the axis direction is not less than 2 millimeters.

4. The central tube for the filter cartridge according to claim 1, wherein the first transverse reinforcing rib set is flush with the first fitting surface, and a free end of the first transverse reinforcing rib has a rounded chamfer.

5. The central tube for the filter cartridge according to claim 1, wherein the first via hole is provided between each of two adjacent first transverse reinforcing rib sets in the axial direction.

6. The central tube for the filter cartridge according to claim 1, wherein two sides of the inner surface of the second flow passage each are provided with a plurality of second transverse reinforcing rib sets, wherein the two sides of the inner surface of the second flow passage are opposite to each other along a direction perpendicular to an axis of the second flow passage, and the plurality of second transverse reinforcing rib sets on the two opposite sides of the inner surface of the second flow passage are staggeredly arranged.

7. The central tube for the filter cartridge according to claim 6, wherein each second transverse reinforcing rib set comprises two second transverse reinforcing ribs, and a distance spaced by the two second transverse reinforcing ribs in the axis direction is not less than 2 millimeters.

8. The central tube for the filter cartridge according to claim 6, wherein the second transverse reinforcing rib set is flush with the second fitting surface, and a free end of the second transverse reinforcing rib has a rounded chamfer.

9. The central tube for the filter cartridge according to claim 6, wherein the second via hole is provided between each of two adjacent second transverse reinforcing rib sets in the axial direction.

10. The central tube for the filter cartridge according to claim 1, wherein the two ends of the first half-tube each are provided with a first process positioning groove extending along a circumferential direction of the first half-tube, the first flow passage is located between the two first process positioning grooves, the two ends of the second half-tube each are provided with a second process positioning groove extending along a circumferential direction of the second half-tube, the second flow passage is located between the two second process positioning grooves.

11. The central tube for the filter cartridge according to claim 1, wherein a section of at least part of any one of the first half-tube and the second half-tube is has a semicircle shape, the first via hole is formed in an arc surface of the first half-tube, and the second via hole is formed in an arc surface of the second half-tube.

12. The central tube for the filter cartridge according to claim 1, wherein the two ends of the first half-tube are provided with a first upper fitting part and a first lower fitting part correspondingly, the two ends of the second half-tube are provided with a second upper fitting part and a second lower fitting part correspondingly, the first upper fitting part is snap-fitted with the second upper fitting part, and the first lower fitting part is snap-fitted with the second lower fitting part correspondingly.

13. The central tube for the filter cartridge according to claim 12, wherein the first upper fitting part and the first lower fitting part each comprise two locking protrusions arranged at intervals in a direction perpendicular to an axis of the first half-tube, and the second upper fitting part and the second lower fitting part each comprise two locking grooves in two sides of the second half-tube, wherein the two sides of the second half-tube are in a direction perpendicular to an axis of the second half-tube.

14. The central tube for the filter cartridge according to claim 12, wherein the two ends of the first half-tube in the axial direction each are provided with a boss protruding beyond the first fitting surface, and the first upper fitting part and the first lower fitting part are arranged on the bosses correspondingly.

15. The central tube for the filter cartridge according to claim 1, wherein the first half-tube comprises a main body, a first columnar body and a second columnar body, the first columnar body and the second columnar body are disposed at two ends of the main body correspondingly, the first columnar body defines the first through hole therein, the second half-tube are fitted with the main body and located between the first columnar body and the second columnar body.

16. The central tube for the filter cartridge according to claim 1, wherein the first closed end of the first half-tube is provided with a first positioning hole extending in the axial direction and spaced apart from the first flow passage, the first closed end of the second half-tube is provided with a second positioning hole extending in the axial direction and spaced apart from the second flow passage.

17. A filtering device, comprising:
a central tube for a filter cartridge comprising:
   a first half-tube having a first fitting surface extending along an axial direction of the first half-tube, and the first fitting surface being slotted to provide a first flow passage extending along the axial direction, the first half-tube having a first closed end and a second end having a first through hole communicated with the first flow passage, a side wall of the first half-tube having a first via hole communicated with the first flow passage;
   a second half-tube having a second fitting surface extending along an axial direction of the second half-tube, and the second fitting surface being slotted to provide a second flow passage extending along the axial direction, the second half-tube having a first closed end and a second end having a second through hole communicated with the second flow passage, a side wall of second half-tube having a second via hole communicated with the second flow passage, the first half-tube and the second half-tube being butted, the first fitting surface and the second fitting surface being opposite to each other, the first half-tube and the second half-tube being fitted to provide a hollow straight tube; and
   a membrane element disposed between the first half-tube and the second half-tube, and closing the first flow passage and the second flow passage respectively, wherein an inner surface of at least one of the first flow passage and the second flow passage is provided with a reinforcing rib abutting against the membrane element, and two sides of the inner surface of the first flow passage are each provided with a plurality of first transverse reinforcing rib sets, and the two sides of the inner surface of the first flow passage are opposite to each other along a direction perpendicular to an axis of the first flow passage, and the plurality of first transverse reinforcing rib sets on the two opposite sides of the inner surface of the first flow passage are staggeredly arranged; and
an upper-end cover provided with a first guiding tube and a second guiding tube, the upper-end cover being connected to the second end of the first half-tube and the second end of the second half-tube, the first guiding tube being inserted in the first through hole, and the second guiding tube being inserted in the second through hole; and
a lower-end cover connected to the first close ends of the first half-tube and the second half-tube.

18. The filtering device according to claim 17, wherein the first close end of the first half-tube is provided with a first positioning hole extending in the axial direction and spaced apart from the first flow passage, the first close end of the second half-tube is provided with a second positioning hole extending in the axial direction and spaced apart from the second flow passage, the lower-end cover is provide with a first positioning tube and a second positioning tube, the first positioning tube is inserted in the first positioning hole, and the second positioning tube is inserted in the second positioning hole.

* * * * *